United States Patent
McLeod et al.

(10) Patent No.: US 12,217,051 B2
(45) Date of Patent: Feb. 4, 2025

(54) DEVICE TO BUILD PROGRAMS ON ALTERNATIVE CPU ARCHITECTURES AND A METHOD THEREOF

(71) Applicant: Red Hat, Inc., Raleigh, NC (US)

(72) Inventors: Ian McLeod, Chicago, IL (US); Eric Curtin, Dublin (IE); Pierre-Yves Chibon, Puteaux (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/086,760

(22) Filed: Dec. 22, 2022

(65) Prior Publication Data

US 2024/0211251 A1 Jun. 27, 2024

(51) Int. Cl.
*G06F 21/56* (2013.01)
*G06F 8/41* (2018.01)
(Continued)

(52) U.S. Cl.
CPC ........... *G06F 8/76* (2013.01); *G06F 8/447* (2013.01); *G06F 9/455* (2013.01); *G06F 9/4552* (2013.01); *G06F 9/50* (2013.01); *G06F 13/385* (2013.01); *G06F 13/4282* (2013.01); *G06F 21/567* (2013.01); *G06F 2213/0042* (2013.01)

(58) Field of Classification Search
CPC .. G06F 13/4282; G06F 13/385; G06F 21/567; G06F 9/455; G06F 9/4552; G06F 9/50; G06F 2213/0042; G06F 8/76; G06F 8/447
See application file for complete search history.

(56) References Cited

U.S. PATENT DOCUMENTS

| 8,051,306 | B2 | 11/2011 | Wong et al. |
| 8,843,880 | B2 * | 9/2014 | Carey ............ G06F 8/30 711/170 |

(Continued)

FOREIGN PATENT DOCUMENTS

| CN | 101094074 A | 12/2007 |
| CN | 101771707 B | 2/2010 |

OTHER PUBLICATIONS

David Nield, How to Run Your Own secure, Portable PC from a USB Stick, Nov. 15, 2021, [Retrieved on Apr. 4, 2024]. Retrieved from the internet: <URL: https://www.wired.com/story/how-to-run-tails-secure-portable-pc-usb-stick/> 15 Pages (1-15) (Year: 2021).*

(Continued)

*Primary Examiner* — Anibal Rivera
(74) *Attorney, Agent, or Firm* — Kilpatrick Townsend & Stockton LLP

(57) ABSTRACT

A Universal Serial Bus (USB) device configured to build a program, in a host machine, on an alternative CPU architecture. The USB device comprises a USB interface adapted to be communicatively coupled to the host machine. The USB device further comprises a memory module configured to store a package to build on, in the host machine, the alternative CPU architecture. The USB device further comprises a System-on-a-Chip (SoC) configured to access the stored package from the memory module. The SoC is further configured to, when a connection between the USB interface and the host machine is established, automatically run the stored package in the host machine.

20 Claims, 5 Drawing Sheets

(51) Int. Cl.
  *G06F 8/76* (2018.01)
  *G06F 9/44* (2018.01)
  *G06F 13/38* (2006.01)
  *G06F 13/42* (2006.01)
  G06F 9/455 (2018.01)
  G06F 9/50 (2006.01)

(56) References Cited

U.S. PATENT DOCUMENTS

| | | |
|---|---|---|
| 8,892,164 B2 | 11/2014 | Sherman |
| 8,972,610 B2 | 3/2015 | Chang |
| 10,437,765 B2 | 10/2019 | Whittington |
| 2007/0260831 A1* | 11/2007 | Michael ................ G06F 9/5066 |
| | | 711/162 |
| 2011/0249391 A1* | 10/2011 | Xu ........................ G06F 1/1633 |
| | | 361/679.33 |
| 2017/0177459 A1* | 6/2017 | Salomon ............... G06F 13/385 |
| 2018/0267823 A1* | 9/2018 | Carr .................... G06F 9/45558 |
| 2019/0138460 A1* | 5/2019 | Gutman .............. G06F 9/45558 |
| 2020/0226087 A1* | 7/2020 | Sun ...................... H04N 21/442 |
| 2021/0064753 A1* | 3/2021 | Xiao ...................... G06F 21/562 |
| 2023/0185733 A1* | 6/2023 | Parker ................ G06F 12/1425 |
| | | 726/26 |

OTHER PUBLICATIONS

"Using VMware Workstation Pro"; VMware, Inc.; pp. 118-123. (6 pages.).

* cited by examiner

DEVICE TO BUILD PROGRAMS ON ALTERNATIVE CPU ARCHITECTURES AND A METHOD THEREOF

BACKGROUND

Alternative CPU architectures have gained popularity in various industries. For example, one of the reasons for most automotive manufacturers to choose ARM is energy efficiency. Accordingly, it is needed for a developer to build, test and package on the ARM architecture, as one example of the alternative CPU architectures.

In order to build on alternative CPU architectures, developers use various platforms that provide multiple CPU architectures, while coordinating with their host machines. For example, a host machine, like a computer or a laptop, provides certain means to connect with the external electronic devices. In particular, when CPU of both the host machine and external devices use the corresponding peripheral communication protocols, it is possible to create a direct connection between the CPU of the host machine and the external electronic devices. The direct communication over the peripheral network allows for a flow of information between the CPU of the host machine and the external devices. The available protocols for a peripheral communication include a USB communication protocol, an HDMI communication protocol, Parallel hardware protocol, etc. The existing protocols allow the host machines to use the resources stored in the USB device.

SUMMARY

The present invention provides a Universal Serial Bus (USB) device configured to build programs, in a host machine, on an alternative CPU architecture.

In an example, a USB device configured to build a program, in a host machine, on an alternative CPU architecture is disclosed. The USB device comprises a USB interface adapted to be communicatively coupled to the host machine. The USB device further comprises a memory module configured to store a package to build on, in the host machine, the alternative CPU architecture. The USB device further comprises a System-on-a-Chip (SoC) configured to access the stored package from the memory module. The SoC is further configured to, when a connection between the USB interface and the host machine is established, automatically run the stored package in the host machine.

In an example, a method to build a program, in a host machine, on an alternative CPU architecture from a USB device is disclosed. The method comprises a step of communicatively coupling the USB device to the host machine over USB interface. The method further comprises a step of establishing a communication network between the USB device and the host machine over a USB network. The method further comprises a step of running the package from the device to build on, in the host machine, an alternative CPU architecture. The method achieves all the advantages and technical effects of the USB device of the present disclosure.

In an example, a non-transitory machine-readable medium storing code to build a program, in a host machine, on an alternative CPU architecture from a USB device is disclosed. The transitory machine-readable medium storing code which, when executed by a computer system, causes the computer system to establish, when the USB device is inserted into the host machine, a communication network between the USB device and the host machine. The transitory machine-readable medium storing code further causes the computer system to enable interaction between the USB device and the host machine over the communication network using interaction tools. The transitory machine-readable medium storing code further causes the computer system to run a package, in the host machine, from the device to build on, in the host machine, an alternative CPU architecture.

It is to be appreciated that all the aforementioned implementation forms can be combined.

Additional features and advantages of the disclosed device, method and non-transitory machine-readable medium storing code are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
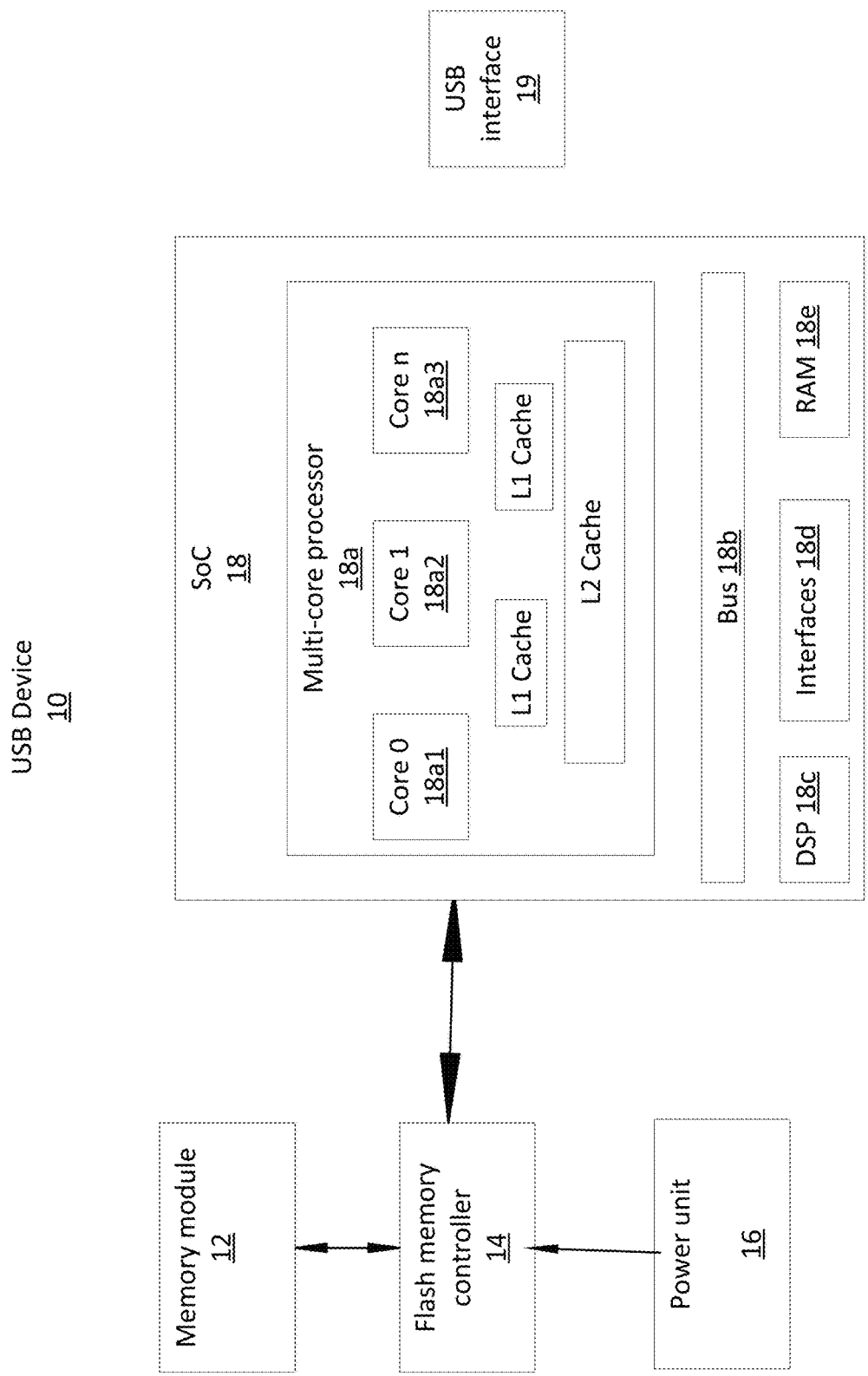
FIG. 1 is a block diagram of an example USB device representing the CPU architecture of the USB device according to an embodiment of the present disclosure.

The present invention relates to a device to develop a program on alternative CPU architectures and a method thereof. More particularly, the present invention relates to a Universal Serial Bus ("USB") device to build a program, in a host machine, on an alternative CPU architecture and a method thereof.

In order to build programs on alternative CPU architectures, currently it is very time consuming for developers to arrange for the different CPU architectures, and then run their programs on various CPU architectures. In particular, for the developers to test or build their programs on different CPU architecture, the developers use various platforms that provide multiple CPU architectures, thereby spending a lot of time on too many hardware components.

The present invention aims to provide a solution that enables developers to build programs, in the host machine, on alternative CPU architectures using minimal hardware components.

The USB device and the method disclosed herein leverage file sharing and resource sharing techniques to build programs, in a host machine, on an alternative CPU architecture with minimal hardware requirement. Additionally, the USB device and the method disclosed herein leverage file sharing and resource sharing techniques to build programs, in a host machine, on an alternative CPU architecture with one or more automated processes. For example, the device and the method disclosed herein may automatically establish a network over USB interface, upon inserting the USB device into the host machine. In another example, the device and the method disclosed herein may automatically establish a network over USB interface, upon connecting the USB device with the host machine via cable connection. Once the network is established between the workstation and the USB device, it is possible to share many resources, including one or more of displays, storage, network access, camera access, etc. For example, the USB device carrying one or more alternative CPU architectures may use the resources of the host machine, thereby allowing the developer to build programs, in the host machine, on alternative CPU architectures. Thus, the amount of time required to set up an alternative CPU architecture is reduced. Moreover, the present invention make it possible for developers to build programs, in the host machine, on an alternative CPU architecture using minimal hardware components.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or a step to be performed by external entities is not reflected in the description of a specific detailed element of that entity that performs that specific step or functionality, it should be clear for a skilled person that said methods and functionalities can be implemented in respective software, hardware elements or any kind of combination thereof. It will be appreciated that features of the present disclosure are susceptible to being combined in various combinations without departing from the scope of the present disclosure as defined by the appended claims.

Throughout the specification, the term "host machine" refers to a machine, typically a laptop, a computer system or a workstation. Thus, the terms "host machine", "laptop", "workstation" are used as synonyms in the specification. Likewise, the terms "USB device", "guest device", "guest stick", "USB stick", "development stick" may refer to a device having a USB plug interface and to a device that inserts into a USB port of the host machine. Likewise, the terms "codes" and "programs" are interchangeable used.

The invention will now be described with the help of drawings.

FIG. 1 is a block diagram of an example USB device 10 representing the CPU architecture of the USB device 10 according to an embodiment of the present disclosure. In some embodiments, the USB device 10 may include one or more suitable logics, circuitries, interfaces, and/or codes that are configured to build programs, in the host device, on an alternative CPU architecture. In an example USB device, the USB device 10 may comprise a memory module 12, a flash memory controller 14, a power unit 16, a System-on-a-Chip (SoC) 18 and a USB interface 19. Examples of the USB device 10 may include but not limited to a USB stick, any smart phone or any smart device, a personal digital assistant, a portable computing device, or an electronic device enabled with the USB connections or the USB network. Further examples of the USB devices may include, but are not limited to, any electronic device that may be powered over USB peripheral connection.

In an example, the SOC 18 may comprise a fast multi-core processor 18a. In the said example embodiment, the multi-core processor 18a may comprise three processing cores 18a1, 18a2, 18a3. In some embodiments, each of the multi-core processors 18a may comprise at least one processing core. In some embodiments, each of the multi-core processors 18a may comprise upto 'n' number of processing cores. In some embodiments, the SoC 18 may comprise a plurality of L1 caches and L2 caches associated with the processing cores 18a1, 18a2, 18a3. In some embodiments, the SoC 18 may comprise a Digital Signal Processor (DSP) 18c, a Network Interface Card (NIC) 18d, and a Random Access Memory (RAM) 18e. In some embodiments, the SoC 18 may include, but not limited to, a Raspberry Pi system or ARM/IOT systems. In some embodiments, the USB device 10 may comprise more than one memory module 12. In some embodiments, the memory module 12 of the USB device 10 may comprise a fast memory. In some embodiments, the memory module 12 may comprise an expandable memory. Examples of the one or more memory module 12 may include, but are not limited to, a block storage system, a file storage system, an object storage system, or a combination thereof.

In some embodiments, the network interface card (NIC) 18d includes hardware and/or software that is configured to establish communication with the host machine 20. Examples of the network interface card (NIC) 18d may include but not limited to, a computer port, a network socket, a network interface controller (NIC), and any other network interface device.

In some embodiments, the SoC 18 further comprises a bus 18b. The bus 18b is configured to interconnect the components of the SoC 18, like the processing cores 18a1 to 18a3, cache memory etc. In some embodiments, one or more local buses of suitable architecture may be used to interconnect the components of the SoC 18.

Figure 2:
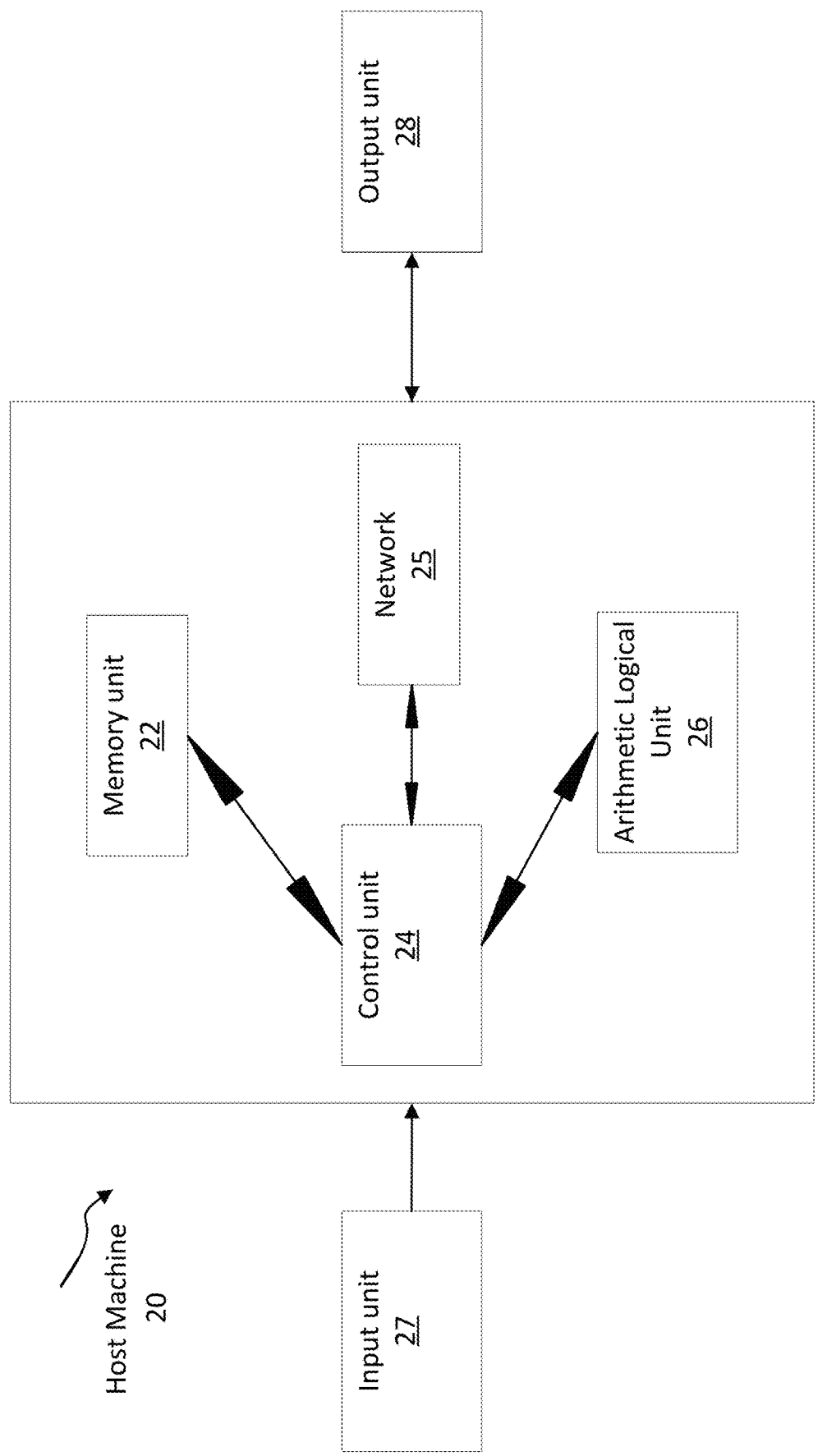
FIG. 2 is a block diagram of an example host machine representing the CPU architecture of the host machine according to an embodiment of the present disclosure.

FIG. 2 is a block diagram of an example host machine 20 representing the CPU architecture of the host machine 20 according to an embodiment of the present disclosure. In some embodiments, the host machine 20 may include suitable logics, circuitries, interfaces, and/or codes that are configured to power the USB device 10. In some embodiments, the host machine 20 may include suitable logic, circuitry, interfaces, or code that is configured to execute the instructions stored in the memory unit 22. In an example, the central processing unit or the arithmetic logic unit 26 of the host device 20 may include but not limited to a processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry. Examples of the host machine 10 may include, but are not limited to a computer, a personal digital assistant, a portable computing device, or an electronic device.

In an example host machine, the host machine 20 may comprise a memory unit 22, a control unit 24, a network 25, an arithmetic logical unit 26, an input unit 27, and an output unit 28. For example, the host machine 20 may be any computer system or laptop, particularly any computer system or laptop configured with a general CPU architecture.

Figure 3:
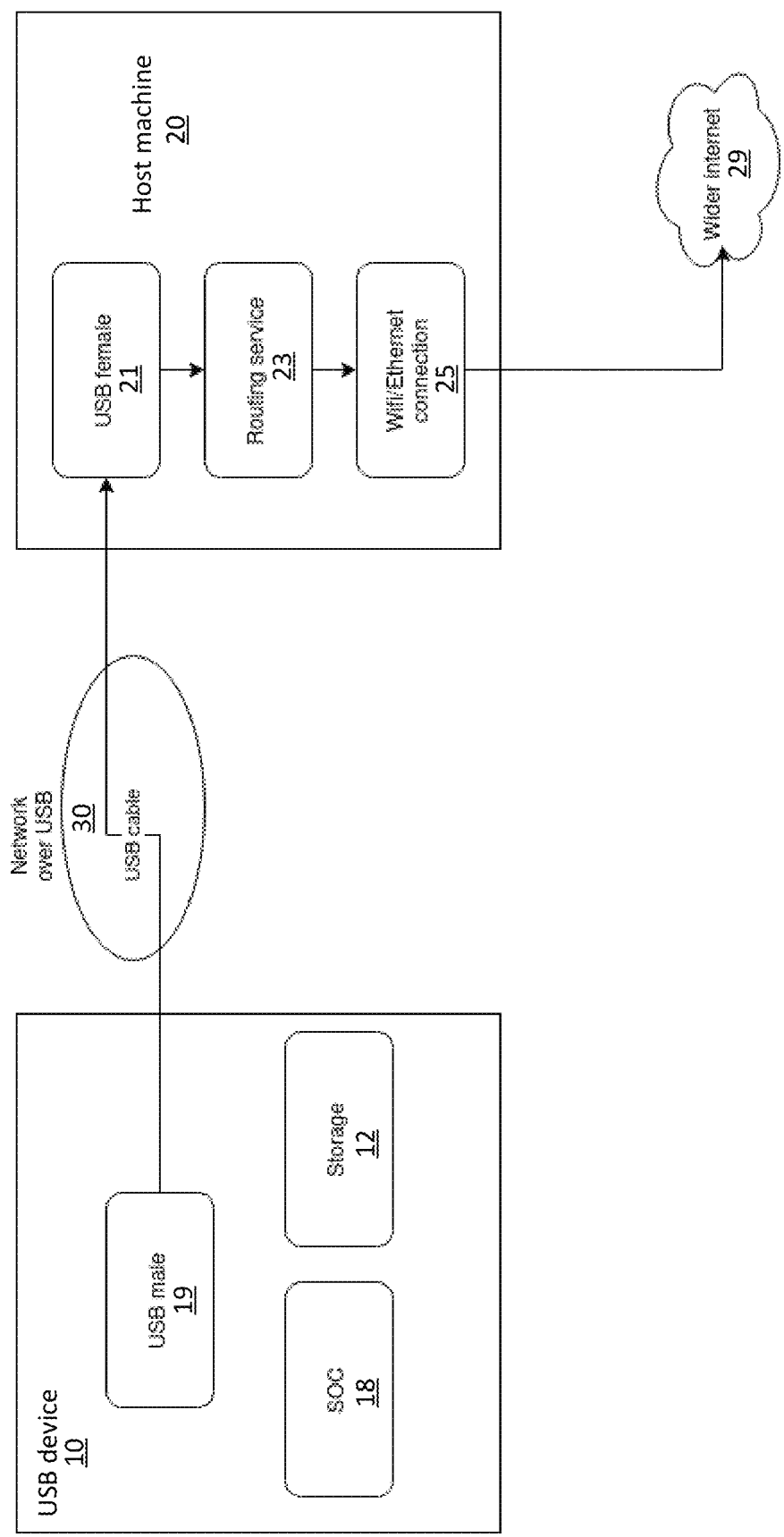
FIG. 3 is a block diagram of an example USB device and a host machine forming a network connection according to an embodiment of the present disclosure.

In some embodiments, as shown in FIG. 3, the host machine 20 may further comprise one or more routers 23 to enable routing service. In an example host machine 20, the host machine may further comprise one or more adapters 25 for respective Wifi connection, Bluetooth and/or for Ethernet connection. For example, the one or more adapters 25 in the host machine 20 may be configured to enable the host machine to connect with a wider public network, like connecting over internet 29.

FIG. 3 is a block diagram of an example USB device 10 and a host machine 20 forming a network connection 30 or a communication network 30, according to an embodiment of the present disclosure. In an embodiment, the communication network 30 may be formed over the USB connection.

As shown in FIG. 3, in some embodiments, the memory module 12 of the USB device 10 is configured to store a package 13. In some embodiments, the memory module 12 of the USB device 10 may be configured to store more than one packages 13. In some embodiments, the memory module 12 may be configured to store a package 13 that enables developers to build programs, in the host machine, on the alternative CPU architecture. In some embodiments, the memory module 12 may be configured to store suitable drivers that establish communication with the host device 20. In some embodiments, the memory module 12 may be configured to store a combination of the packages 13 and the suitable drivers to establish communication with the host device 20.

In some embodiments, the USB male interface 19 of the USB device 10 may be adapted to be communicatively coupled to the host machine 20, over the USB network. In one embodiment, inserting the USB device 10 into the host device 20 automatically establishes the network connection 30 for communication between the USB device 10 and the host machine 20. In another embodiment, inserting the USB device 10 into the host device 20 may require user intervention to establish a connection for communication between the USB device 10 and the host machine 20.

In some embodiments, a USB cable or a USB connector may be used to form the communication network 30 between the USB device 10 and the host machine 20. In some embodiments, the communication network between the USB device 10 and the host machine 20 provides a platform for communication, interaction and file sharing between the USB device 10 and the host machine 20. For example, the USB device 10, by its USB interface plug 19, may be coupled to the host machine 20 to establish a connection for communication between the USB device 10 and the host machine 20.

In an example, upon inserting the USB device 10 into the host machine 20, a program runs on the USB device 20 to set up a network with the host machine. In some embodiments, upon inserting the USB device 10 into the host machine 20 via cable connection, the program runs on the USB device 20 to set up a network with the host machine that goes over the USB cable and to the receiving end of the host machine 20. The host machine 20 creates the same network automatically.

One effect of inserting the USB device 10 into the host machine 20 may be that the USB device 10 and the host machine 20 communicate with each other. For example, upon setting up the communication network between the USB device 10 and the host machine 20, the SoC 18 of the USB device 10 may send one or more queries or requests to the one or more processors of the host machine 20 to access public network. The processors of the host machine are configured to send back a reply to the requests through the same communication network to the USB device 10. For example, the USB device 10 may request use of the resources of the host machine 20.

In some embodiments, the SOC 18 of the USB device 10 and the host machine 20 may interact using interaction tools. In one example, the interaction tools may be standard communication protocols used to access a device or a server over a network. For example, the SSH, VNC, the everyday ones are few such known interaction tools that may be used between the SOC 18 of the USB device 10 and the host machine for interaction over the communication network.

In some embodiments, the communication network enables file sharing between the SOC 18 and the host machine 20. For example, the USB device 10 may access the files of the host machine 20 allowing a developer to develop a program, in the host machine 20, on the alternative CPU architecture. Some examples of the file sharing system include, but not limited to, Network File sharing (NFS) or NVMe/TCP, etc.

In some embodiments, the network connection 30 between the USB device 10 and the host machine 20 is not only limited to communication, interaction and file sharing, but also includes all sorts of communications within the scope of a standard network that enables sharing of resources between two devices, or between the USB device 10 and the host machine 20. For example, network 30 over USB may be a standard Ethernet network.

In some embodiments, the USB device 10 may access the resources of the host machine 20. In one example, the USB device 10, without storing too many software or files in the memory 12, may easily build programs, in the host machine 20, on the alternative CPU architecture. For example, the USB device 10 may have an ARM processor that a developer may want to use on his x86 laptop. The developer will plug the USB device 10 having the ARM processor into the host machine 20, thereby developing programs, in the host machine 20, on the ARM architecture. One effect can be that the need to use some ARM processor on a remote server or a need to go through network all the time is reduced.

In some embodiments, the USB device 10 may access the resources of the host machine 20 that connect the USB device 10 to the wider public network 29. In an example, the USB device 10 may be configured to use the adapters 25 of the host machine 20 to use internet connection from the host device 20. For example, the USB device 10 may access the resources of the host machine 20 that provide internet access to the USB device 10. At least one effect can be that the USB device 10 may not store all relevant software or drivers in the memory 12 of the USB device 10. For example, if some software or files are unavailable in the host machine 20, the USB device 10 may still be provided access to those missing software or files by connecting to the wider public network 29 from the host machine 20.

In some embodiments, the SoC 18 may use other hardware resources of the host machine 20. For example, the USB device 10 may use the Bluetooth of the host machine 10.

In an example of communication and interaction, the host machine 20 may be configured to route the packages 13 shared by the USB device 10. That is, in the communication mechanism from the host machine 20 to the USB device 10, the host machine 20 forms a routing network for the package 13. Any requests sent by the SoC 18 of the USB device to the host machine 20, the host machine 20 communicates with the USB device 10 about those requests over the same communication network. For example, the SoC 18 of the USB device 10 sends a request to access the public network:

the request routes from the SOC 18 of the USB device to the USB cable connection, then from the USB cable connection to the host machine 20, which connects with the public network. The host machine 20 then routes a reply of the request back to the SoC 18. At least one effect of forming the communication network 30 between the USB device 10 and the host machine 20 is that the communication network 30 enables communication mechanism from the host machine 20 to the USB device 10.

In some embodiments, the SOC 18 of the USB device 10 may be further configured to provide an external network access over the communication network. For example, the external network access allows the USB device 10 to use wider public access for resources that may not be available in the host machine 20. In another example, the USB device 10 makes use of the external network access for wider public access may be to upgrade resources of the USB device 10 and/or of the host machine 20 from the internet. At least one effect can be that the USB device 10 is provided access to internet by the host machine 20 for building an alternative CPU architecture in the host machine 20.

Figure 4:
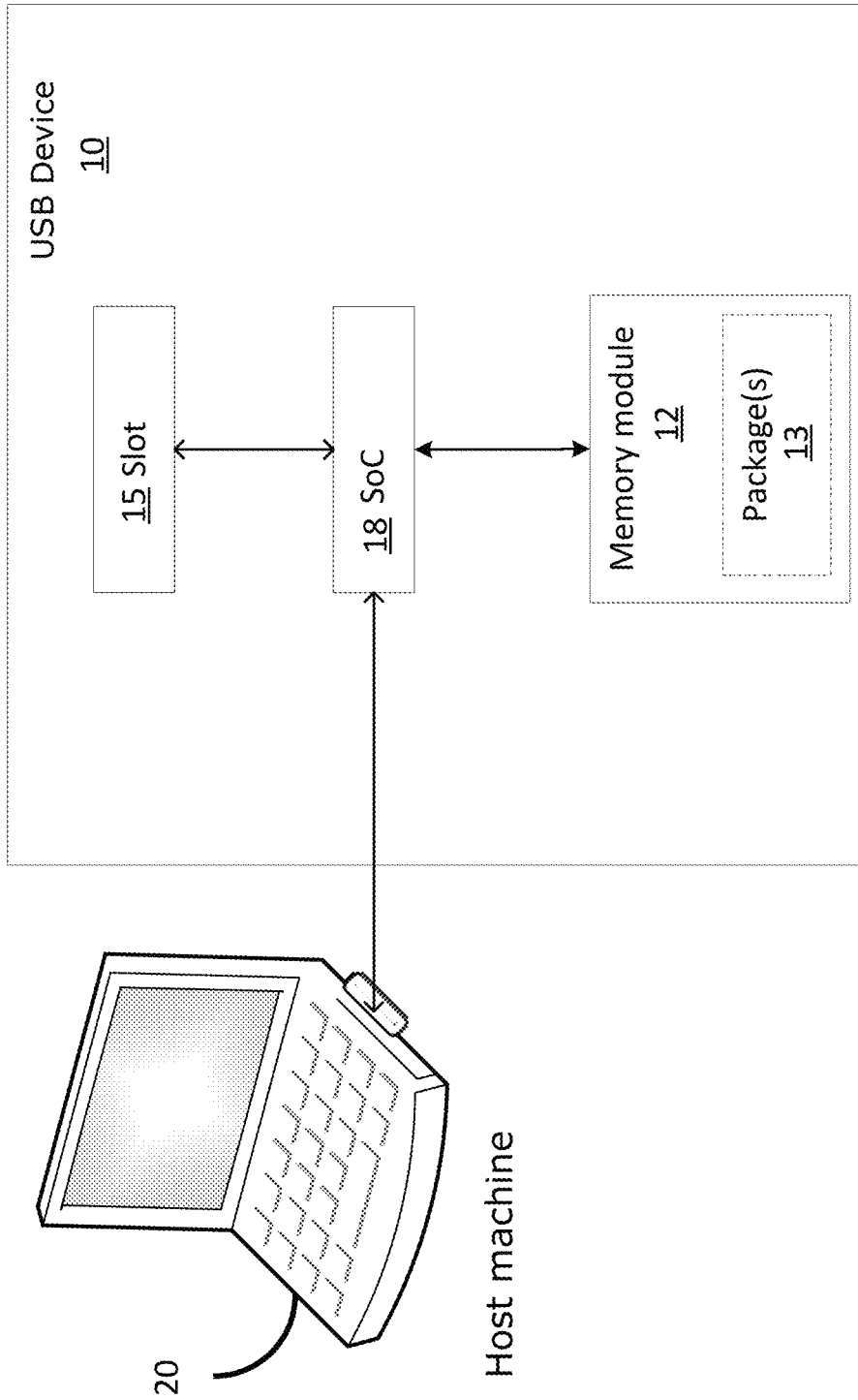
FIG. 4 is a representation of an example USB device coupled to an example host machine according to an embodiment of the present disclosure.

FIG. 4 is a representation of an example USB device 10 coupled to the host machine 20, according to an embodiment of the present disclosure. In some embodiments, the USB interface 19 comprises a male USB interface, USB plug or a USB connector. In some embodiments, the USB interface 19 is configured to be inserted into the host machine 20. In one example, the USB male connector 19 is inserted into a USB port of the host machine 20. In some embodiments, the USB device 10 may work with a cable connection to connect with a computer system. In some embodiments, a cable may communicatively couple the USB device and the host machine. For example, the USB device 10 may be configured such that a USB cable is used to communicatively couple the USB device 10 and the host machine 20.

In some embodiments, the cable may comprise of at least two ends, a first end and a second end. In one embodiment, the first end of the cable may be adapted to connect with the male interface of the USB device and the second end of the cable may be adapted to connect with the female interface of the host machine. For example, the first end of the cable may be adapted to connect with the USB plug of the USB device and the second end of the cable may be adapted to connect with the USB port of the host machine.

In some embodiments, the SoC 18 may be configured to communicate with the memory module 12 to access the packages 13 stored in the memory module 12 of the USB device 10. When the USB network connection 30 is established between the USB device 10 and the host machine 20, the SoC of the USB device 10 may be configured to automatically run the package 13 in the host machine 20 to build programs, in the host machine 20, on alternative CPU architectures. For example, the SoC 18 is configured to communicate with the memory module 12, to access the stored packages 13 and to build programs, in the host machine 20, in an alternative CPU architecture based on the stored packages 13.

In another embodiment, the SoC 18 may be configured to store packages 13 to build on, in the host machine, alternative CPU architectures. When the USB connection is established between the USB device 10 and the host machine 20, the SoC 18 of the USB device 10 may be configured to automatically run the package 13 in the host machine 20. For example, the SoC 18 of the USB device 10 may not communicate with the memory module 12 and/or with the microchip received in the slot 15 to build on, in the host machine 20, alternative CPU architectures. For example, the USB device 10 allows the developers to build programs, in the host machine 20, on a CPU architecture that differs from the existing architecture of the host machine 20.

In some embodiments, the USB device 10 may further comprise a slot 15. In some embodiments, the USB device 10 may comprise more than one slots 15. In an example, the slot 15 may be configured to receive additional memory card(s) and/or a microchip. In some embodiments, the SOC 18 is configured to be communicatively coupled with the slot 15 to run the drivers installed in the microchip and/or the memory card(s) received in the slot 15.

In some embodiments, the SoC 18 is configured to communicate with the memory module 12 and/or to communicate with the microchip received in the slot 15. In some embodiments, the SoC 18 is configured to communicate with the memory module 12 to access the stored packages 13. In some embodiments, the SoC 18 is configured to communicate with the microchip received in the slot 15 to access any additional drivers. In some embodiments, the SoC 18 is configured to communicate with the microchip received in the slot 15 to access any additional drivers and to communicate with the memory module 12 to access the stored packages 13. When the USB connection is established between the USB device 10 and the host machine 20, the SoC 18 of the USB device 10 may be configured to automatically run the stored package 13, along with any drivers from the microchip received in the slot 15, in the host machine 20 to build on alternative CPU architectures. For example, when the USB device 10 is inserted into the host machine 20, Based on the stored packages 13 and the additional drivers from the microchip, the SoC 18 is further configured to build on, in the host machine 20, an alternative CPU architecture. Some examples of the stored packages may include but not limited to packages that set up tunnels, convert data as needed for the alternative CPU architecture.

In some embodiments, the package 13 may include one protocol, e.g. a DSP gadget 1 protocol. In another embodiment, the package 13 may include more than one protocols. For example, the package 13 may include a code on an ARM CPU architecture.

Figure 5:
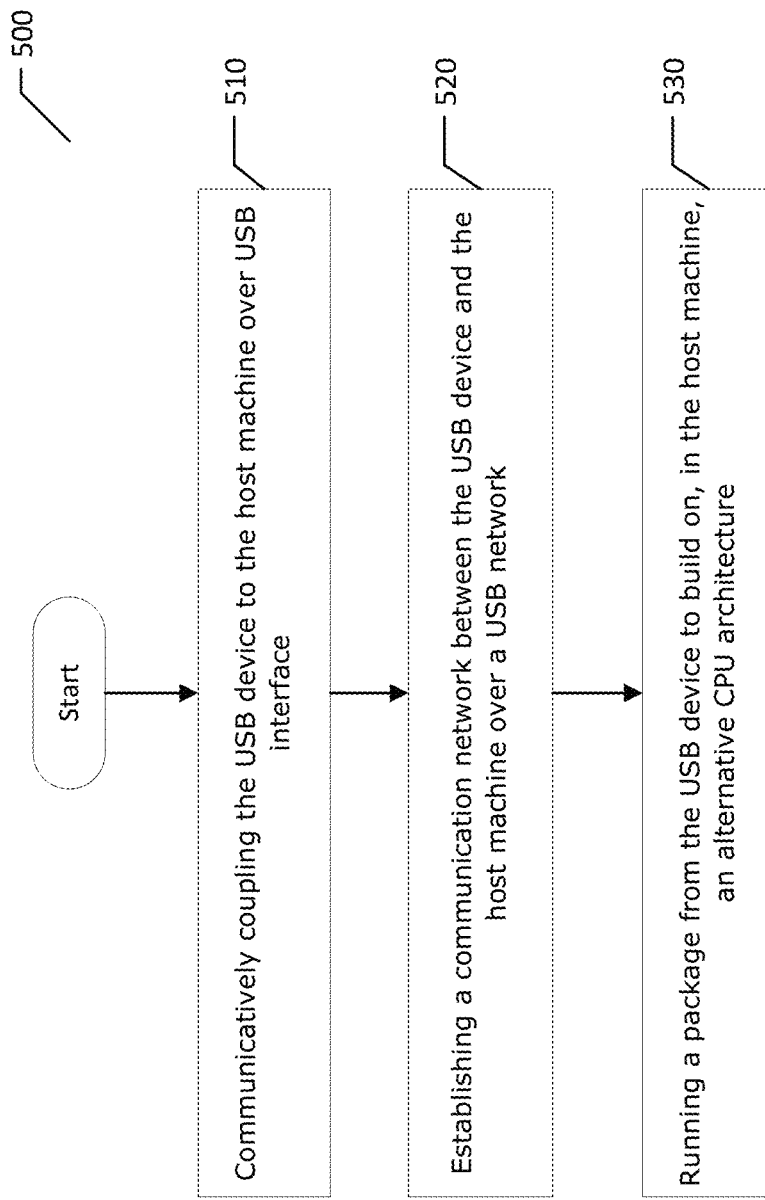
FIG. 5 is a flowchart illustrating an example method to build on, in a host machine, an alternative CPU architecture by a USB device according to an embodiment of the present disclosure.

FIG. 5 is a flowchart illustrating an example method 500 to build on, in a host machine, an alternative CPU architecture by a wireless USB device according to an embodiment of the present disclosure. Although the example method 500 is described with reference to the flowchart illustrated in FIG. 5, it will be appreciated that many other methods of performing the acts associated with the method 500 may be used. For example, the order of some of the steps defined in the method 500 may be changed, certain steps may be combined with other steps, one or more steps may be repeated, and some of the steps described may be optional. The method 500 may be performed by processing logic that may comprise hardware (circuitry, dedicated logic, etc.), software, or a combination of both.

The example method 500 to build on, in a host machine, an alternative CPU architecture from a USB device, includes communicatively coupling the USB device to the host machine over USB interface (step 510). For example, inserting a USB plug of the USB device into a USB port of the host machine. In another example, a male USB interface of the USB device is inserted into a USB port of the host machine. In some embodiments, the step 510 includes communicatively coupling the USB device and the host machine by a cable. For example, the cable may comprise of at least two ends, a first end and a second end. In one embodiment, connecting the first end of the cable with the male interface of the USB device and connecting the second end of the cable with the female interface of the host machine. For example, connecting the first end of the cable with the USB plug of the USB device and connecting the second end of the cable with the USB port of the host machine to form a cable connection. At least one effect can be of enabling a communication mechanism between the USB device and the host machine, either by a cable connection or by a direct connection.

Additionally, in some embodiments, the method 500 includes establishing a communication network between the USB device and the host machine. In one embodiment, the method 500 includes establishing a communication network between the USB device and the host machine over a USB network (step 520). In one embodiment, the method 500 includes, upon inserting the USB device into the host machine, automatically, by the SoC of the USB device, establishing a communication network between the USB device and the host machine. For example, the method comprises automatically setting up the tunnels and/or shared file systems, etc., upon inserting the USB device into the host machine. As noted above, the communication network is formed by the SOC of the USB device with the host machine, upon inserting the USB device into the host machine. For example, upon inserting the USB device into the host machine, a system running on the USB device sets up a network that enables interaction between the USB device and the host machine. In another example, upon inserting the USB device into the host machine, a system running on the USB device sets up a network that enables file sharing between the device and the host machine. In one embodiment, the method 500 comprises sharing, by the USB device, resources of the host machine. For example, accessing, by the USB device, the files stored in the host machine. In another example, accessing, by the USB device, the resources of the host machine, like internet connection to get access to a wider public network. At least one effect can be that storing all relevant software or drivers in the memory of the USB device is not required. For example, if some software or files are unavailable in the host machine, the USB device may still be provided access to those missing software or files by having connection to the wider public network from the host machine. In another example, the USB device may make use of the wider public access to upgrade resources of the USB device and/or of the host machine from the internet, as required. Some examples of the host machine's resources that may be used by the USB device 10 include, but not limited to, host device's displays, host device's storage, host device's camera, etc.

Additionally, in some embodiments, the method 500 includes running a package to build on, in a host machine, an alternative CPU architecture from the USB device (Step 530). In an example, the USB device, without storing too many software or files in the memory, may build on, in the host machine, the alternative CPU architecture. In order to build the alternative CPU architecture, the USB device may require some public resources available in the internet. The USB device may be configured to use the resources of the host machine to access the internet.

Additionally, in some embodiments, the method 500 includes inserting, into the USB device, a microchip. The microchip may be used to provide additional storage space for the user.

Yet another aspect of the invention relates to a non-transitory machine-readable medium storing code which, when executed by a computer system, cause the computer system to establish, when the USB device is inserted into the host machine, a communication network between the USB device and the host machine. As noted above, the communication network is used by the USB device and the host machine for various interaction, file sharing and/or resource sharing tasks. Further, the non-transitory machine-readable medium storing code which, when executed by a computer system, cause the computer system to enable interaction, using interaction tools, between the USB device and the host machine over the communication network. Next, the non-transitory machine-readable medium storing code which, when executed by a computer system, cause the computer system to run a package from the device to build on, in the host machine, an alternative CPU architecture.

By developing the USB device with such minimal hardware, it is possible to create economically effective and technically advanced tool to develop programs on, in a host machine, an alternative CPU architecture. For example, it is possible to have the minimum hardware required in a USB form factor to build programs, in a host machine, on an alternative CPU architecture. That is, USB being the only interface between the development tool and the host machine. Typically, the USB stick would have an SoC (with RAM on the SoC), some disk/SD card slot and a male USB connector. Yet another apparent advantage of the invention is the automation of the resource sharing over USB, which in turn reduces the time and complexity involved in configuring and setting up alternative CPU architectures in the host machine. That is, on insertion of the USB connector of the USB device in the host machine, the USB device automatically configures and sets up alternative CPU architectures in the host machine.

Any additional hardware resources needed by the USB stick such as public internet access, would be obtained by using the resources available on the host machine and accessing these resources via USB. It is within the scope of the invention that the USB device may comprise, in addition to other disclosed hardware features, a fast multi-core SoC.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAS, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. The person skilled in the art will appreciate that the above-disclosed techniques related to the resource sharing, by the disclosed USB device, of any host machines to build alternative CPU architectures may be modified to be implemented in any other peripherals. Thus, all such changes and modifications to the example embodiments described herein will be apparent to those skilled in the art.

The invention claimed is:

1. A Universal Serial Bus (USB) device configured to build a program, in a host machine, on an alternative Central Processing Unit (CPU) architecture, the USB device comprising:
   a. a USB interface adapted to be communicatively coupled to the host machine;
   b. a memory module configured to store a package that enables the program to be built, in the host machine, on the alternative CPU architecture provided by the USB device; and
   c. a System-on-a-Chip (SoC) including a processor comprising the alternative CPU architecture that is different from a CPU architecture of the host machine, the SoC configured to access the stored package from the memory module, wherein the SoC is further configured to, when a USB connection between the USB interface and the host machine is established, automatically run the stored package in the host machine.

2. The USB device of claim 1, wherein the USB interface is configured to be inserted into the host machine.

3. The USB device of claim 2, wherein the SoC is configured to form a communication network with the host machine over the USB connection.

4. The USB device of claim 3, wherein the SoC is configured to provide an external network access in the communication network.

5. The USB device of claim 4, wherein the external network access enables communication from the SoC to the host machine.

6. The USB device of claim 5, wherein the SoC and the host machine use interaction tools for communication.

7. The USB device of claim 6, wherein the communication network enables file sharing between the SoC and the host machine.

8. The USB device of claim 1, wherein the SoC is configured to use resources of the host machine.

9. The USB device of claim 8, wherein the resources of the host machine used by the SoC includes a routing connection, a WiFi connection and/or an Ethernet connection.

10. The USB device of claim 9, wherein the SoC is configured to access internet using the resources of the host machine.

11. The USB device of claim 1, wherein the USB interface comprises a male USB interface.

12. The USB device of claim 11, wherein the male USB interface is configured to be communicatively coupled to a USB port of the host machine.

13. The USB device of claim 1, further comprising at least one slot configured to receive a microchip.

14. The USB device of claim 13, wherein the SoC is configured to connect with the microchip.

15. A method to develop programs, in a host machine, on an alternative Central Processing Unit (CPU) architecture from a Universal Serial Bus (USB) device, comprising:
   a. communicatively coupling the USB device to the host machine over a USB interface, the USB device comprising a processor including the alternative CPU architecture and a package used to develop the programs, in the host machine, on the alternative CPU architecture, wherein the alternative CPU architecture is different from a CPU architecture of the host machine;
   b. establishing a communication network between the USB device and the host machine over a USB network; and
   c. in response to establishing the communication network, automatically running the package from the USB device to build the programs, in the host machine, on the alternative CPU architecture.

16. The method of claim 15, further comprising enabling interaction between the USB device and the host machine using interaction tools.

17. The method of claim 16, further comprising enabling file sharing between the USB device and the host machine.

18. The method of claim 17, further comprising using, by the USB device, resources of the host machine.

19. The method of claim 18, further comprising inserting, into the USB device, a microchip.

20. A non-transitory machine-readable medium storing code which, when executed by a computer system, cause the computer system to:
   establish, when a Universal Serial Bus (USB) device is inserted into a host machine, a communication network between the USB device and the host machine, the host machine routing, using the communication network, a package of the USB device that enables a program to be built;
   enable interaction, using interaction tools, between the USB device and the host machine over the communication network; and
   run the package from the USB device to build the program, in the host machine, on an alternative Central Processing Unit (CPU) architecture provided by the USB device, the USB device including a processor comprising the alternative CPU architecture that is different from a CPU architecture of the host machine.

* * * * *